United States Patent
Park et al.

(10) Patent No.: US 7,372,788 B2
(45) Date of Patent: May 13, 2008

(54) METHOD FOR MANAGING DEFECTIVE AREA ON WRITE-ONCE OPTICAL RECORDING MEDIUM, AND OPTICAL RECORDING MEDIUM USING THE SAME

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 894 days.

(21) Appl. No.: 10/700,664

(22) Filed: Nov. 5, 2003

(65) Prior Publication Data

US 2004/0136292 A1 Jul. 15, 2004

(30) Foreign Application Priority Data

Jan. 14, 2003 (KR) .................. 10-2003-0002328

(51) Int. Cl.
*G11B 15/52* (2006.01)

(52) U.S. Cl. .................. 369/47.14; 369/53.17

(58) Field of Classification Search .................. None
See application file for complete search history.

(56) References Cited

U.S. PATENT DOCUMENTS

| | | | | |
|---|---|---|---|---|
| 6,341,109 B1 * | 1/2002 | Kayanuma | ............... | 369/47.14 |
| 6,667,939 B1 * | 12/2003 | Miyamoto | ............... | 369/53.21 |
| 6,842,580 B1 * | 1/2005 | Ueda et al. | ............... | 386/125 |
| 6,883,111 B2 * | 4/2005 | Yoshida et al. | ............... | 714/6 |

FOREIGN PATENT DOCUMENTS

| | | | |
|---|---|---|---|
| EP | 0 350 920 A2 | 1/1990 |
| EP | 1 043 723 A1 | 10/2000 |
| WO | WO 01/22416 A1 | 3/2001 |

* cited by examiner

*Primary Examiner*—Paul W. Huber
(74) *Attorney, Agent, or Firm*—Birch, Stewart, Kolasch & Birch, LLP (57) ABSTRACT

A method for managing a defective area of a write-once optical recording medium, and an optical recording medium using the same, is provided. In an optical disc device for recording/reproducing data using an optical disc such as a BD-WO type disc, the method permits the normal reading and reproducing of recording data written on a defective area of the disc, through a replacement write operation for the recording data of the defective area. When a defect is detected within a predetermined recording sector of the optical disc during the recording process, the recording data is written on a spare area corresponding to the defective area and the thus written data is managed. To accomplish this during data recording, the method selectively searches a write location of temporary defect list (TDFL) information, which is effective before disc finalization, or defect list (DFL) information, which becomes effective upon execution of a disc finalization operation. The TDFL information is written in an assigned recording sector and includes one or more defective area data locators indicative of defective areas as detected. Write location information and identification information enable the selective search of the DFL information after disc finalization and are written, together with the DFL information, as disc definition information in a defect management area assigned to the disc's lead-in area.

9 Claims, 7 Drawing Sheets

METHOD FOR MANAGING DEFECTIVE AREA ON WRITE-ONCE OPTICAL RECORDING MEDIUM, AND OPTICAL RECORDING MEDIUM USING THE SAME

This application claims the benefit of Korean Application No. 10-2003-0002328 filed on Jan. 14, 2003, which is hereby incorporated by reference.

BACKGROUND OF THE INVENTION

1. Field of the Invention

The present invention relates to optical recording methods and media, and in particular, to a method for managing a defective area on a WORM-type optical recording medium, and an optical recording medium using the same. The method is particularly adapted for recording data on write-once optical discs such as those using the recently developed Blu-ray disc format known as BD-WO.

2. Discussion of the Related Art

Data recording devices and media using optical read/write means have generally been categorized according to their writing capability or flexibility. Among read-only optical recording media, there are those using CD-ROM and DVD-ROM formats, which have no write capability. Among known disc standards that allow multiple write operations to be freely performed, there are CD-RW, DVD-RAM, DVD-RW, and DVD+RW types, which are rewritable compact discs and digital versatile discs.

WORM-type discs, on the other hand, are adopted for use as data storage devices requiring large storage capacity. Such discs, however, have limited recording flexibility and are for use in write-once read-many applications. These include CD-R and DVD-R types, which are recordable compact discs and digital versatile discs.

Meanwhile, a new type of high-density DVD, known as a Blu-ray disc, which is a large-capacity optical disc for recording high-quality audio and video data using a blue-violet laser, has been developed. The Blu-ray disc adopts a rewritable disc format known as BD-RE.

In the above types of optical recording media, surface imperfections and defects are generated during their manufacture, handling, or use. Accordingly, a method for managing the defective areas is used during a data recording operation, so that data reproduction can be carried out normally.

Figure 1:
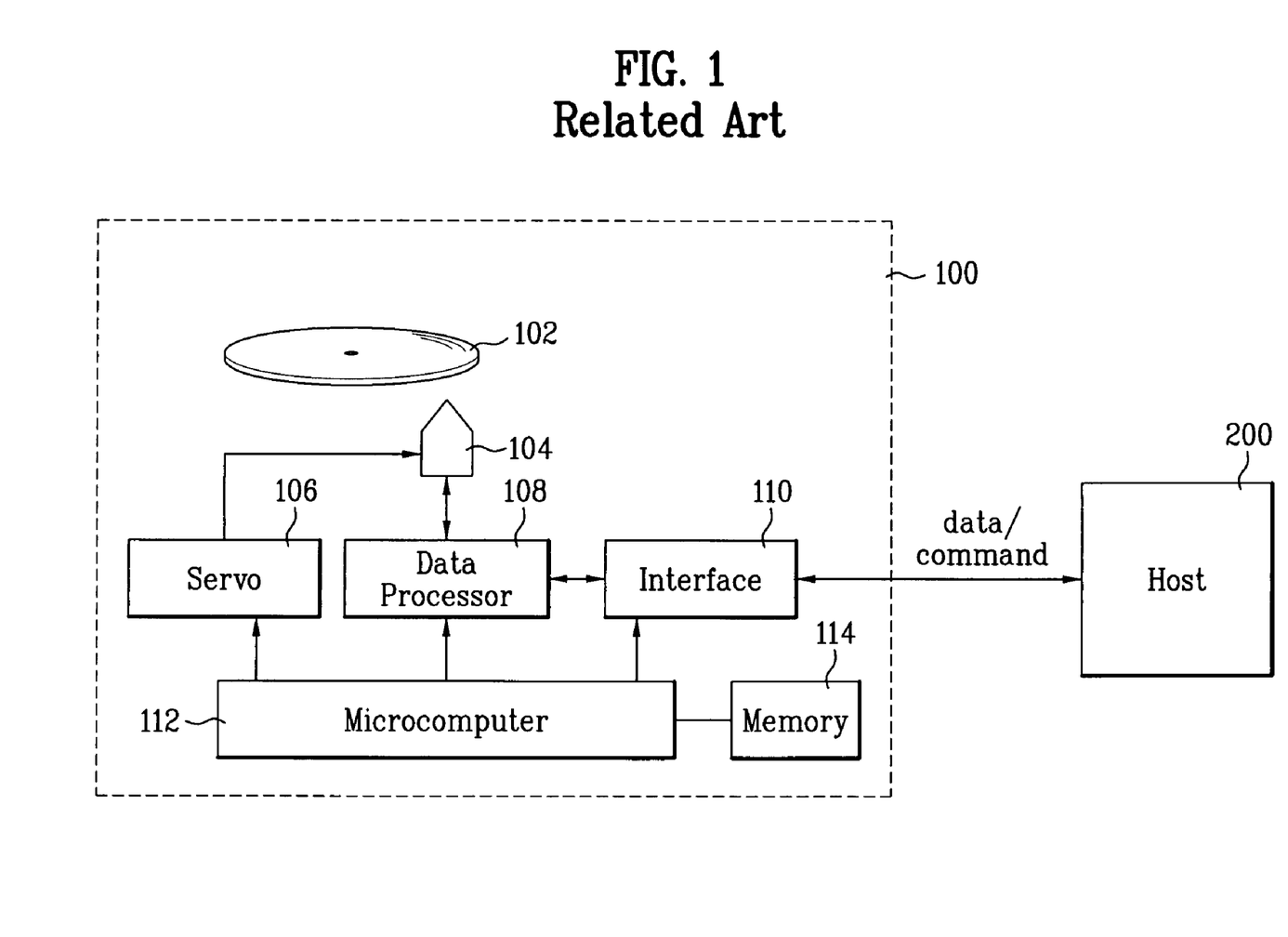
FIG. 1 is a schematic diagram of a general optical disc recording/reproducing device, according to a related art.

Referring to FIG. 1, an optical disc recording/reproducing device 100 for use with an optical recording medium 102, such as a BD-RE formatted disc, receives a data/command input from a host (or controller) 200. The optical disc recording/reproducing device 100 is provided with an optical pickup 104 for writing/reading data to/from an inserted optical recording medium, a pickup servo 106 for controlling the optical pickup to achieve proper tracking and to maintain a controlled distance with respect to the surface of the optical recording medium, a data processor 108 for processing data to and from the optical pickup by restoring to a desired signal value a reproduction signal received from the optical pickup or by modulating a recording signal received from the host for transfer to the disc, an interface 110 for transferring data between the host and the recording/reproducing device, a microcomputer 112 for controlling the recording/reproducing device, and a memory 114 for storing a program and for temporarily storing various information including defect management information and data. Under the control of the host 200 and stored programming, the optical pickup 104 reads data stored (or written) on a disc, providing a data signal input to the data processor 108 for reproduction processing and output, and writes data onto specified areas of the disc using a write signal output from the data processor. During a write operation, the optical disc recording/reproducing device 100 receives a data stream (or an encoded analog signal) and outputs the write signal to the optical pickup 104 in accordance with a command input via the host 200 and the program stored in the memory 114 and executed by the microcomputer 112.

Figure 2:
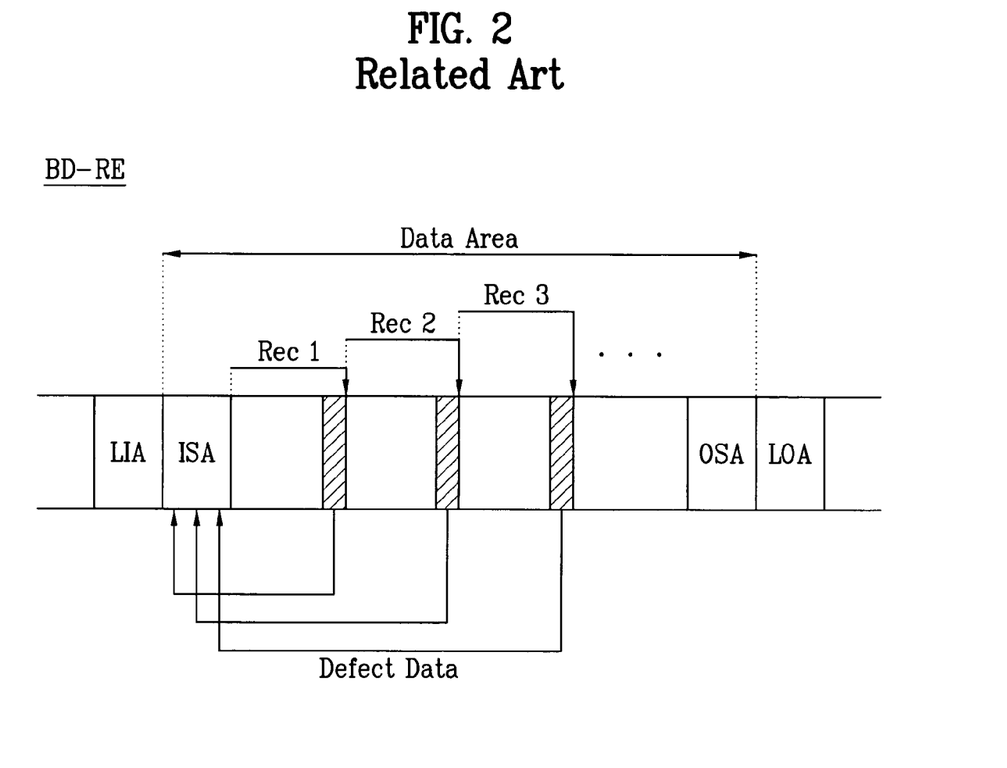
FIG. 2 is a diagram for illustrating a method for managing a defective area on a rewritable optical recording medium, such as a BD-RE type disc.

Referring to FIG. 2, a BD-RE type disc for use with the device of FIG. 1 is divided into assigned areas. The assigned areas essentially comprise a data area set between a lead-in area (LIA) and a lead-out area (LOA). The data area includes an inner spare area (ISA) adjacent the lead-in area and an outer spare area (OSA) adjacent the lead-out area.

As above the optical disc recording/reproducing device 100 processes input data from a host 200 and writes the data onto an optical disc in clusters corresponding to an error correction code block unit. If during a write operation the existence of a defective area is detected in the data area, the optical disc recording/reproducing device 100 carries out a series of replacement write operations to write a data cluster corresponding to the detected defective area in one of the two spare areas (shown in the example of FIG. 2 as the ISA). Therefore, by writing a data cluster of a defective area in a spare area instead of the defective area, the data can be read and reproduced from the spare area, thus preventing the occurrence of writing errors even when an optical disc exhibits defects in the data area and thereby assuring data security and data integrity.

The above method is carried out using an optical recording medium that allows free access to the data recording areas, since a rewritable disc is used. Therefore, in managing the data of the defective areas, the optical disc recording/reproducing device has unlimited use of the recording area. If a WORM-type disc is used, however, the write operation is performed only once and must be completed before normal data retrieval operations by the user can be carried out.

For example, another type of Blu-ray disc, using a format known as BD-WO, has been recently developed. The BD-WO type disc, which is a write-once type disc, cannot make use of known methods for managing a defective area on the disc, since the standardization of this type of disc format has only recently begun. An immediate solution is required.

SUMMARY OF THE INVENTION

Accordingly, the present invention is directed to a method for managing a defective area on a write-once optical recording medium, and an optical recording medium (i.e., an optical disc such a BD-WO) using the same, that substantially obviates one or more of the problems due to limitations and disadvantages of the related art.

An object of the present invention, which has been devised to solve the foregoing problem, lies in providing a method for managing a defective area on a write-once optical recording medium, by which data written in and read from a defective area of the disc is relocated (rewritten), and then managed, through the performance of a replacement write operation in which the data is written in an alternative data area (spare area) corresponding to the defective area.

It is another object of the present invention to provide a method for managing a defective area on a write-once optical recording medium, by which normal data reproduction can be achieved after a data recording operation is completed, irrespective of the existence of one or more defective areas detected during recording.

It is another object of the present invention to provide data security and data integrity in using a write-once optical recording medium, particularly for data recording operations using a host computer reading from a BD-WO disc and employing a linear replacement technique at the time of recording.

It is another object of the present invention to provide a method for managing a defective area on a write-once optical recording medium, by which BD-WO standardization is facilitated.

It is another object of the present invention to provide an optical recording medium suitable for adopting the above method.

It is another object of the present invention to provide a system for utilizing an optical recording medium adopting the above method.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method for managing a defective area of a write-once optical recording medium, including steps of: detecting, after writing data in a predetermined recording sector of the optical recording medium, the existence of a defect within the predetermined recording sector; replacing the data written in the defective recording sector, by writing the data in a spare area assigned to a data area of the optical recording medium and writing locator information as temporary defect list information in an assigned recording sector of the optical recording medium, the locator information being indicative of the defective recording sector; and writing, as disc definition structure information in a defect management area assigned to a lead-in area of the optical recording medium, write location information for accessing the temporary defect list information and identification information for determining access to the write location information.

In another aspect of the present invention, there is provided a method for managing a defective area of a write-once optical recording medium, including steps of: identifying a disc finalization state by searching a defect management area assigned to a lead-in area of the optical recording medium and detecting and checking identification information indicative of the disc finalization state from disc definition structure information in the defect management area; selectively searching a write location of defect list information or temporary defect list information in the disc definition structure information, based on the identification information; and carrying out a replacement writing operation or a normal reproducing operation for the defective area, based on the selectively searched defect list information and temporary defect list information.

In another aspect of the present invention, there is provided a system having a programmable device for optically recording/reproducing data to/from a write-once optical recording medium. The device can be programmed to perform the necessary steps of the method of the present invention, including those for recording data and reproducing recorded data.

In another aspect of the present invention, there is provided a write-once optical recording medium including: a data area; a lead-in area disposed adjacent the data area; and a defect management area in the lead-in area for writing information pertaining to a plurality of write locations for accessing temporary defect list information and defect list information, and identification information for selective access to the write locations, as disc definition structure information, wherein the temporary defect list information and the defect list information are written in separate locations.

Adoption of the method of the present invention for an optical recording medium such as a BD-WO disc assures data security and data integrity, particularly during data recording operations using a host computer employing a linear replacement technique.

It is to be understood that both the foregoing explanation and the following detailed description of the present invention are exemplary and illustrative and are intended to provide further explanation of the present invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Throughout the drawings, like elements are indicated using the same or similar reference designations.

Figure 3:
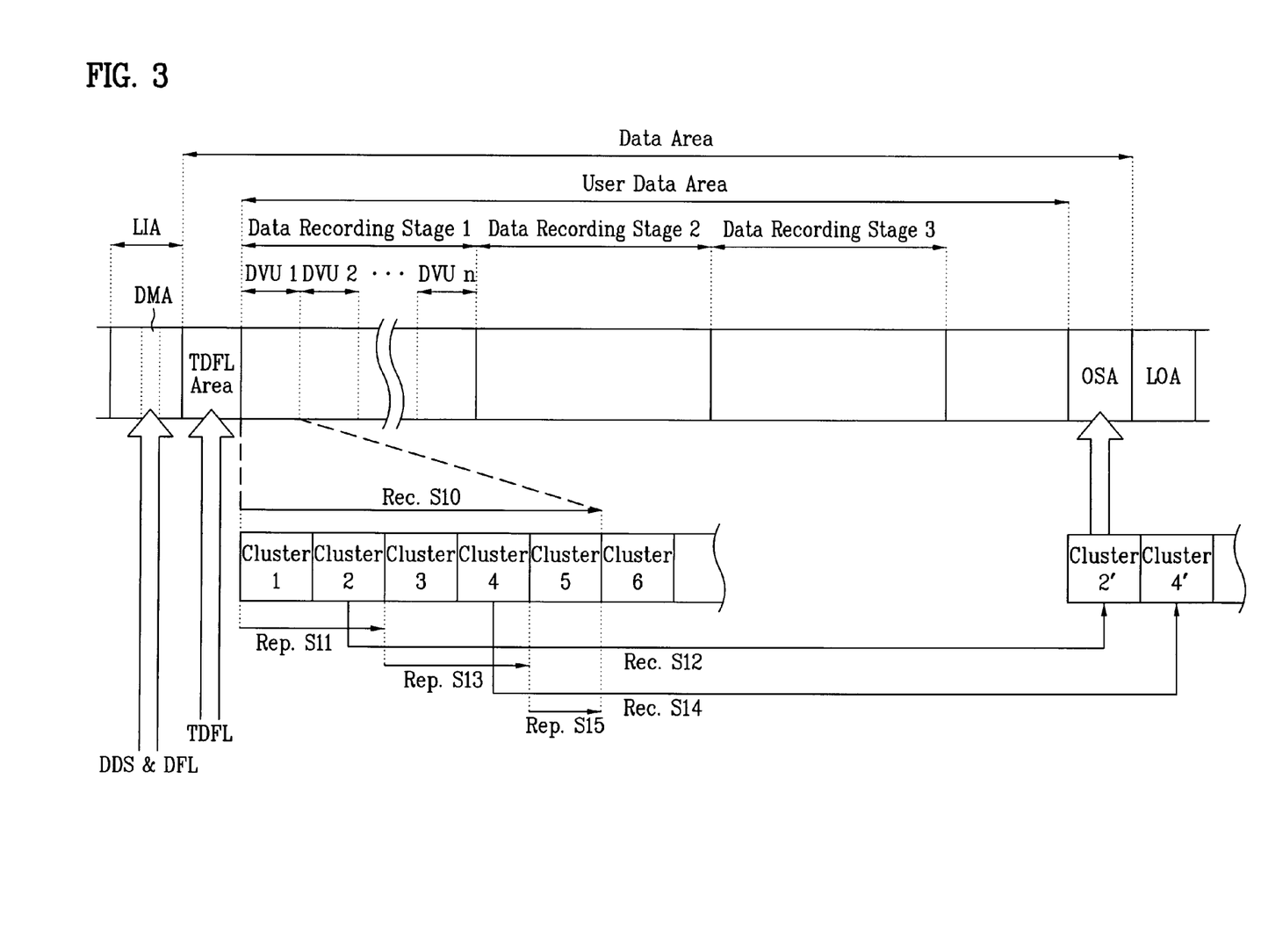
FIG. 3 is a diagram showing assigned areas of a write-once optical recording medium, such as a BD-WO type disc, for illustrating a method for managing a defective area on the disc, in accordance with a preferred embodiment of the present invention.

Referring to FIG. 3, in which assigned areas of an optical recording medium such as a BD-WO type disc are depicted to illustrate the method according to the present invention, a data area is set between a lead-in area (LIA) and a lead-out area (LOA), wherein the data area is essentially comprised of a user data area and a non-user data area disposed on either side of the user data area. The user data area is assigned both physical sector numbers (PSN) and logical sector numbers (LSN), while the non-user data areas are assigned physical sector numbers only. The non-user data areas are respectively comprised of an outer spare area (OSA) and a temporary defect list (TDFL) area. The outer spare area is for writing data corresponding to a defective area, i.e., replacement data, while the TDFL area is for writing defective area data locators pertaining to the defective areas as detected and the corresponding replacement data. The defective area data locator information may be written either cumulatively or continuously.

Though not shown in the drawings, the OSA and TDFL areas may be alternatively located or there may be additionally assigned areas, such as an inner spare area (ISA). For example, an ISA may be provided additionally or substituted for the OSA, or the TDFL area may be disposed in a non-user data area adjacent the OSA or in the LIA.

In recording data on an optical recording medium such as that shown in FIG. 3, the optical disc recording/reproducing device 100 of FIG. 1 executes an internal program to write data in a temporally continuous manner on a predetermined writing sector in the user data area. The write operation progresses until data recording ends or until the last recording sector has been recorded. Each instance of writing will be referred to as a data recording stage.

The predetermined writing sector is set as a defect verification unit (DVU) by which, during the data recording stage, a defective area is detected using a verify-after-write operation performed after each DVU. One DVU may have a recording size equivalent to any number of physical tracks or clusters, and for the sake of convenience in describing the embodiments of the present invention, this recording size has been arbitrarily set to five clusters. A plurality of defect verification units (DVU 1 through DVU n) make up one instance of recording or a data recording stage having a temporal continuity, and each of data recording stages 1, 2, and 3 are made up of a number of DVUs dependent on the amount of data being recorded.

The verify-after-write operation is performed by the optical disc recording/reproducing device 100, which executes a repetitious series of detecting operations to determine the presence of defective areas corresponding to the written data of one DVU. In each defective area detecting operation, the data written in the DVU is reproduced to verify its recording status; that is, it is determined whether the data was written successfully such that normal reproduction is possible. If normal reproduction cannot be verified, it is determined that a defect is present.

For example, after sequentially and continuously writing data in physical clusters 1-5 of the DVU 1 through a recording operation S10, the optical disc recording/reproducing device 100 performs a verify-after-write operation by progressively reproducing the data written in the DVU 1, to verify normal reproduction and thereby detect the presence of any defective areas. In progressively reproducing, the optical disc recording/reproducing device 100 sequentially reads the data as written, starting again from the first (or next in position) cluster and reading continuously until detection of the first (or next) occurrence of an unverifiable data cluster through a reproducing operation S11, indicating the presence of a defective area in, say, the physical cluster 2. Then, the optical disc recording/reproducing device 100 temporarily stores in its memory 114 the data of the physical cluster 2. The temporarily stored (buffered) data is used to carry out a replacement write operation through a recording operation S12, whereby replacement data corresponding to the defective cluster is written as a replacement cluster 2' in the OSA instead of the defective area. Here, the data of the second cluster may be written starting from either end of the OSA.

After the completion of a replacement write operation as above, the optical disc recording/reproducing device 100 continues reproducing the data of the DVU 1 through a reproducing operation S13, progressing to the next cluster, i.e., to the physical cluster 3. When another defective area is detected in, say, the physical cluster 4, the optical disc recording/reproducing device 100 carries out another replacement write operation through a recording operation S14, in which the data of the defective cluster is buffered and then written as a replacement cluster 4' in the OSA in succession to the replacement cluster 2'.

A continuation of the verify-after-write operation for DVU 1 through a reproducing operation S15 may find no further defective areas, which completes the data recording of DVU 1 for the data recording stage 1. Thus, the DVU 1 ultimately contains the data of the physical clusters 1, 3, and 5 and has two defective areas, the data of which is written in the OSA as replacement clusters 2' and 4' corresponding to the defective areas. The same process is repeated for each DVU until the conclusion of the data recording stage 1 by the execution of recording and verify-after-write operations for the DVU n. In doing so, a physical cluster 6 is written as the first cluster of the DVU 2.

Thereafter, i.e., in succession to a completed verify-after-write operation for the DVU n, the optical disc recording/reproducing device 100 writes a defective area data locator for identifying each defective area and locating the corresponding replacement data. These locators are written as TDFL information and stored in the TDFL area. To increase the access rate of the TDFL information, the optical disc recording/reproducing device 100 also writes, as disc definition structure (DDS) information, write location information in a defect management area (DMA) assigned in the LIA.

Figure 4:
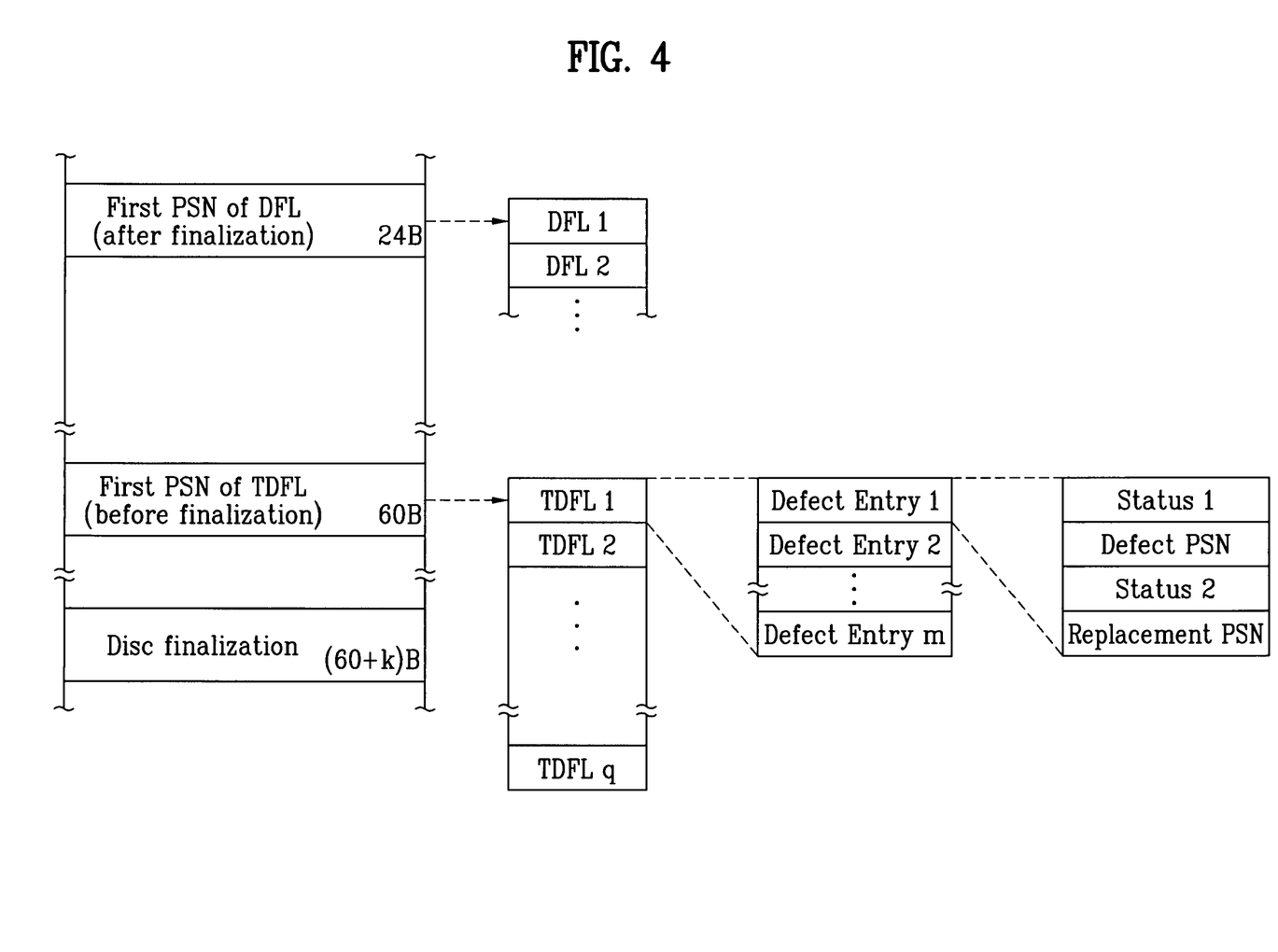
FIG. 4 is a diagram showing locator information written according to the method of the present invention.

As shown in FIG. 4, the TDFL information comprises a plurality of defect entries, each expressed as pair of PSNs, i.e., a defect PSN and a replacement PSN corresponding thereto. Here, the defect PSN is the physical sector number of the defective area, and the replacement PSN is the physical sector number of the area in which the data of the defective area is written. Each defect entry includes status information in addition to the PSNs. The status information is comprised of status 1 and status 2 information, with the status 2 information going unused in the present embodiment. The status 1 information indicates the type of relationship existing between a defective or potentially defective area and any replacement data corresponding thereto, including replacement data recording status, address assignment, defective area confirmation, replacement area availability, and the like.

The recording sector corresponding to, say, the 60th byte (60th byte position) of the DDS information may include write location information for accessing the first PSN for the current TDFL information, i.e., the TDFL information reflecting the latest (most recent) replacement write operation. This write location information is written and managed together with identification information, which comprises a disc finalization flag indicating whether a disc finalization operation has been executed, signaling that the writing process of an optical disc is finalized.

When the identification information shows no disc finalization, the optical disc recording/reproducing device 100 reads the DMA and refers to the write location information to search for a write location. One byte of the identification information may, for example, be written as "0000 XXXX" to indicate that no disc finalization operation has been executed, to be set to "0000 1111" to indicate the execution of disc finalization. At the same time, the identification information may have a size greater than one byte, and the execution of the disc finalization operation may be indicated using values other than "0000 XXXX" and "0000 1111." The DDS information may include write location information for accessing both the first TDFL and the current TDFL, or for selectively accessing either.

When a disc finalization operation is executed according to user operation, the optical disc recording/reproducing device 100 sets the disc finalization flag from a value (e.g., "0000 XXXX") indicating that no disc finalization operation has been executed to a value (e.g., "0000 1111") indicating a disc-finalized state and writes the TDFL information as defect list (DFL) information in the DMA. Thus, upon disc finalization, the write location information stored within the DDS information is written as a final value indicative of the write location of the DFL information. The recording sector corresponding to the 24th byte (24th byte position) of the DDS information may include write location information for accessing the first PSN of the DFL information.

Figure 5:
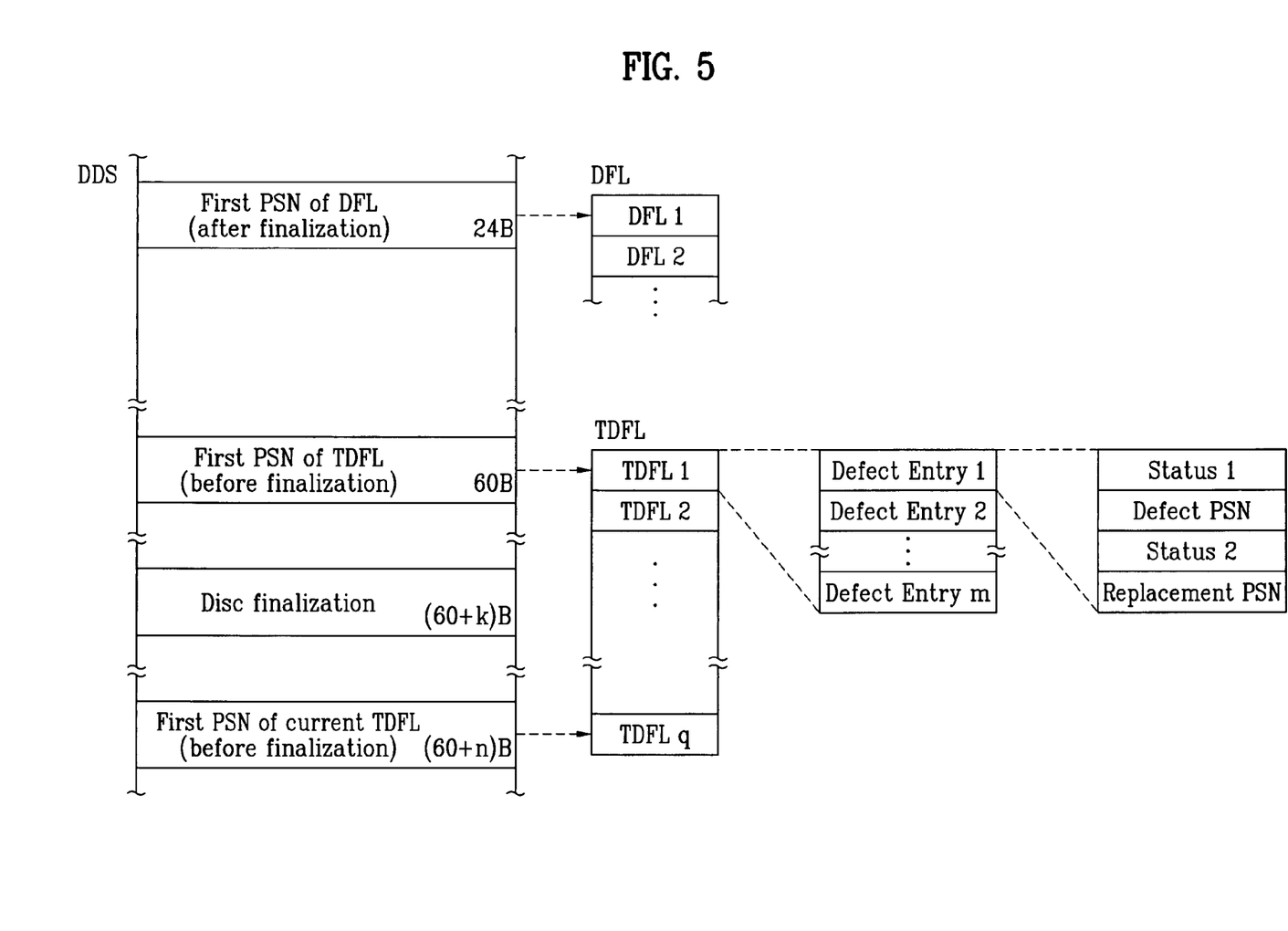
FIG. 5 is a diagram showing locator information written according to the method of the present invention, whereby an access rate can be increased.

Referring to FIG. 5, the DDS information may, to increase the access rate of the last or latest TDFL information (TDFL q), further include write location information corresponding to the first PSN of the most recently written TDFL, i.e., the TDFL information immediately preceding disc finalization.

Figure 6:
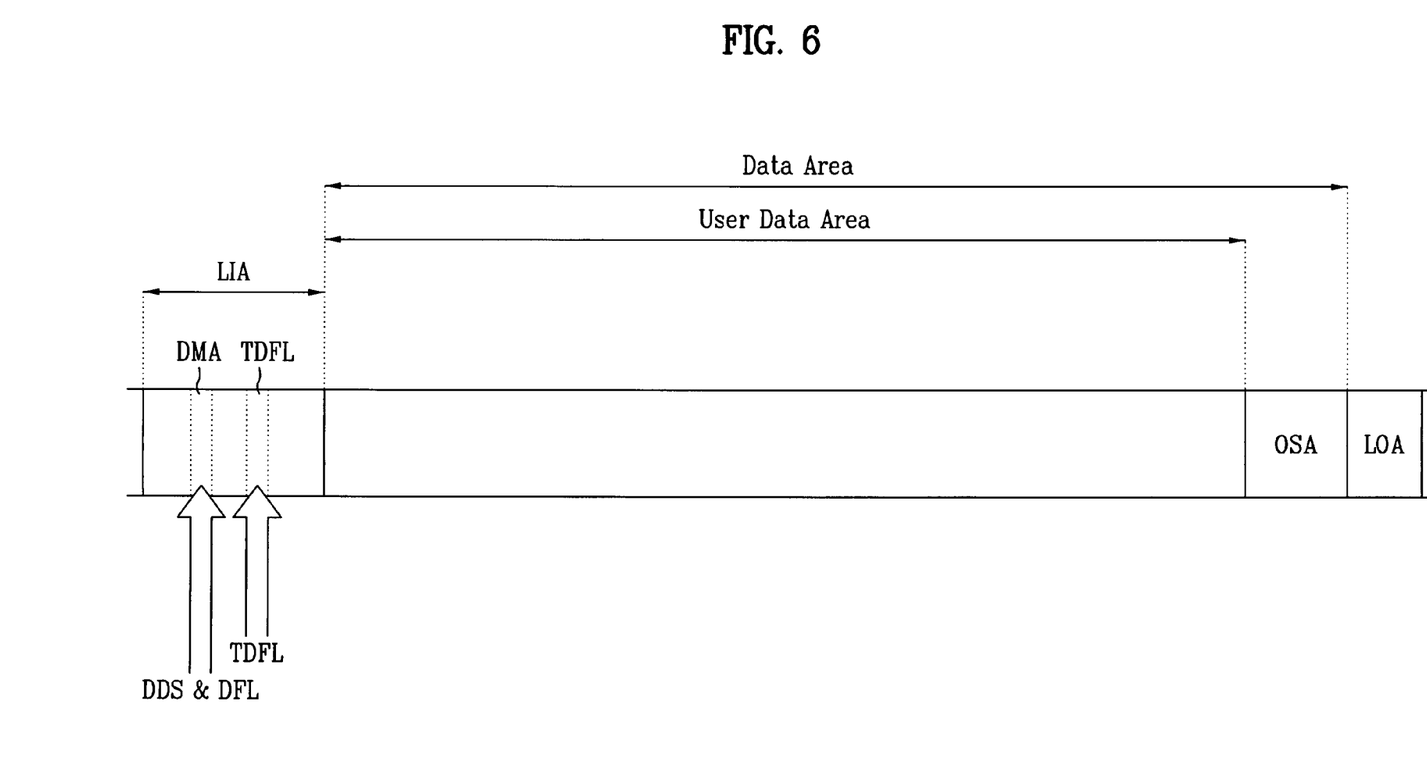
FIG. 6 is a diagram for illustrating a method for managing a defective area on a write-once optical recording medium, such as a BD-WO type disc, in accordance with another preferred embodiment of the present invention.
Figure 7:
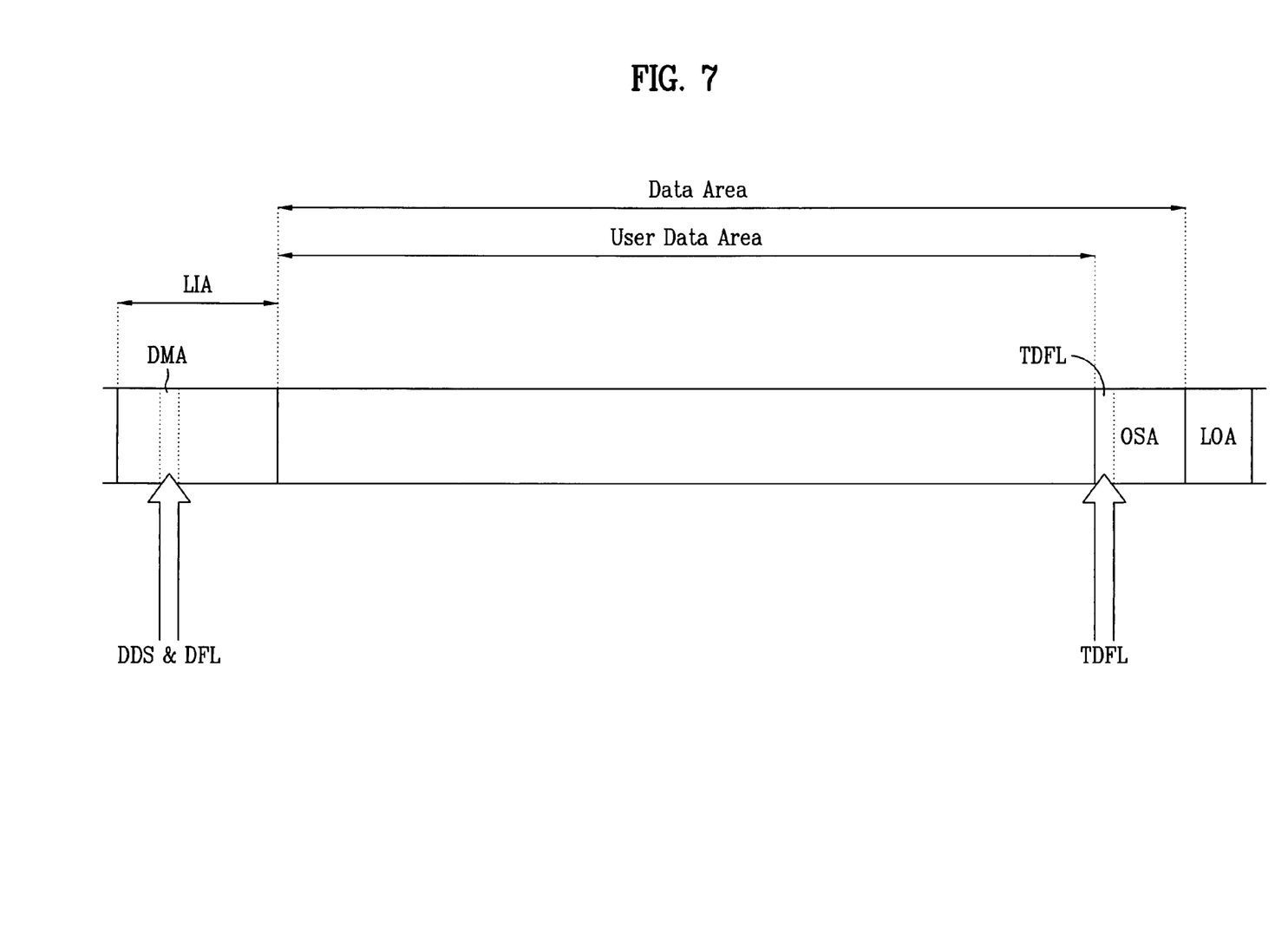
FIG. 7 is a diagram for illustrating a method for managing a defective area on a write-once optical recording medium, such as a BD-WO type disc, in accordance with another preferred embodiment of the present invention.

As shown in FIG. 6, the TDFL information may be included in a recording sector in the LIA. On the other hand, as shown in FIG. 7, the TDFL information may be assigned to a recording sector within the OSA, or may be assigned elsewhere, such as in the LOA.

In the method of the present invention, when an optical recording medium such as a BD-WO type disc is placed into a programmable system such as that shown in FIG. 1, the optical disc recording/reproducing device 100 searches the DMA assigned to the disc's LIA, detects the disc finalization flag from the DDS information of the DMA, checks its value, and thereby determines whether the disc has been finalized. If the disc finalization flag is a value showing that no disc finalization has occurred, the optical disc recording/reproducing device 100 searches and accesses write location information pertaining to the first and/or last (latest) TDFL information in the DDS information, to then search and access the TDFL information. The optical disc recording/reproducing device 100 then carries out a series of replacement write operations or reproducing operations. If, on the other hand, the disc finalization flag is a value showing that disc finalization has occurred, the optical disc recording/reproducing device 100 searches and accesses write location information pertaining to the first and/or last (latest) DFL information stored within the DDS information, to then search and access the DFL information. The optical disc recording/reproducing device 100 may then carry reproducing operations.

By adopting the method for managing a defective area on a write-once optical recording medium according to the present invention, data to be written on a defective area of the disc is written, and effectively managed, through the performance of a replacement write operation in which the data is written in an alternative (spare) data area corresponding to the defective area. Thus, an optical recording medium such as the recently developed BD-WO type disc formatted according to the method can be used to record data through a write-once operation, so that recorded data can be reproduced normally even when there are defects present on the disc. Moreover, adoption of the method of the present invention will facilitate BD-WO standardization by providing a suitable write-once optical recording medium whereby data to be written on a defective area thereof can be effectively managed.

It will become apparent to those skilled in the art that various modifications and variations can be made in the method for managing a defective area on a write-once optical recording medium, and an optical recording medium using the same, according to the present invention without departing from the spirit or scope of the invention. Thus, it is intended that the present invention cover such modifications and variations provided they come within the scope of the appended claims and their equivalents.

What is claimed is:

1. A method for managing a defective area of an optical recording medium, comprising steps of:
   recording, in assigned recording sectors of the optical recording medium, DFL write location information for accessing a defect list (DFL) of the optical recording medium and TDFL write location information for accessing a temporary defect list (TDFL) of the optical recording medium;
   searching the TDFL write location information when the optical recording medium is not in a disc-finalized state, to write defect management information in the temporary defect list; and
   searching the DFL write location information when the optical recording medium is in the disc-finalized state, to read defect management information from the defect list.

2. A method for managing a defective area of an optical recording medium, comprising steps of:
   first recording, in a first assigned recording sector of the optical recording medium, TDFL write location information for accessing a temporary defect list (TDFL);
   writing defect management information in the temporary defect list according to the TDFL write location information;
   second recording, in a second assigned recording sector of the optical recording medium, DFL write location information for accessing a defect list (DFL); and
   reading defect management information from the defect list according to the DFL write location information,
   wherein said first recording step is performed when the optical recording medium is not in a disc-finalized state and said second recording step is performed when the optical recording medium is in the disc-finalized state.

3. The method as claimed in claim 2, wherein the temporary defect list (TDFL) is recorded in a temporary defect list area.

4. The method as claimed in claim 3, wherein the temporary defect list area is allocated to a lead in area of the optical recording medium.

5. The method as claimed in claim 3, wherein the temporary defect list area is allocated to a spare area of the optical recording medium.

6. The method as claimed in claim 2, wherein the defect list (DFL) is recorded in a defect management area.

7. The method as claimed in claim 6, wherein the defect management area is allocated to a lead in area of the optical recording medium.

8. An apparatus for managing a defective area of an optical recording medium, the apparatus comprising:

means for recording, in assigned recording sectors of the optical recording medium, DFL write location information for accessing a defect list (DFL) of the optical recording medium and TDFL write location information for accessing a temporary defect list (TDFL) of the optical recording medium; and means for searching the TDFL write location information when the optical recording medium is not in a disc-finalized state, to write defect management information in the temporary defect list, and for searching the DFL write location information when the optical recording medium is in the disc-finalized state, to read defect management information from the defect list.

9. An apparatus for managing a defective area of an optical recording medium, the apparatus comprising:

means for first recording, in a first assigned recording sector of the optical recording medium, TDFL write location information for accessing a temporary defect list (TDFL), and for second recording, in a second assigned recording sector of the optical recording medium, DFL write location information for accessing a defect list (DFL);

means for writing defect management information in the temporary defect list according to the TDFL write location information; and means for reading defect management information from the defect list according to the DFL write location information, wherein said first recording is performed when the optical recording medium is not in a disc-finalized state and said second recording is performed when the optical recording medium is in the disc-finalized state.

* * * * *